United States Patent [19]

Bender

[11] 4,062,378

[45] Dec. 13, 1977

[54] EASILY DISASSEMBLED, ONE-WAY CHECK VALVE

[75] Inventor: Lloyd F. Bender, Hayward, Wis.

[73] Assignee: Bender Machine Works, Inc., Hayward, Wis.

[21] Appl. No.: 727,280

[22] Filed: Sept. 27, 1976

[51] Int. Cl.² ............................................. F16K 15/06
[52] U.S. Cl. ................................ 137/535; 137/515.5; 137/269.5; 251/367
[58] Field of Search .................. 137/515, 515.3, 515.5, 137/515.7, 541, 269.5, 535; 251/367; 285/DIG. 22

[56] References Cited

U.S. PATENT DOCUMENTS

| D. 226,194 | 1/1973 | Bender | D23/19 |
| 921,691 | 5/1909 | Friday | 285/DIG. 22 |
| 1,593,519 | 7/1926 | Underwood | 137/515.5 X |
| 1,779,421 | 10/1930 | Cox | 137/515.3 |
| 3,645,547 | 2/1972 | Glover | 285/DIG. 22 |

Primary Examiner—William R. Cline
Attorney, Agent, or Firm—James E. Nilles

[57] ABSTRACT

A check valve for a fluid line which can be easily disassembled and assembled for cleaning, inspection, or repair. The valve finds particular utility in cleaning-in-place equipment such as dairy pipe lines and in which the valves and other components must be quickly, easily, and completely disassembled for thorough cleaning at frequent invervals. The valve includes identical end sections which are formed of resilient material such as plastic or the like and which can be snapped on a central valve element guide and also easily disassembled therefrom. A shiftable valve element is located on the central valve guide and can also be easily disassembled therefrom for frequent and thorough cleaning. The width of the central guide is such that the valve element which is also of resilient material, is properly tensioned to insure its accurate location.

6 Claims, 6 Drawing Figures

EASILY DISASSEMBLED, ONE-WAY CHECK VALVE

BACKGROUND OF THE INVENTION

The present valve pertains particularly to use in dairy equipment for example which is required to be cleaned-in-place at frequent intervals in order to comply with the sanitary laws of the various states. Various fluids are passed through such equipment such as milk or orange juice and also various cleaning fluids such as cleaning solutions, acids, rinses, and so forth must also be pumped through the system and then flushed therefrom after periodical use. Consequently, in equipment of this type, the various parts must be completely disassembled so that they can be thoroughly cleaned, rinsed, or sanitized.

General examples of equipment in which the present invention is utilized are shown in various of my U.S. Pat. Nos., such as 3,352,248 issued Nov. 14, 1967 entitled "Fluid Conveying Apparatus;" 3,424,098 issued Jan. 28, 1969 and entitled "Dump Valve for Fluid Conveying Apparatus;" or 3,531,297 issued Sept. 29, 1970 entitled "Vacuum Operated timing device for Fluid Conveying Apparatus."

The present invention is an improvement over that check valve shown in my U.S. Pat. No. 3,921,652 which issued Nov. 25, 1975 and entitled "Apparatus for Automatically Mixing a Cleaning Solution," which patent has been assigned to an assignee common with the present invention. In that patent however, the shiftable valve element did not always seat properly and could otherwise malfunction by being stuck in its guide. Furthermore, that valve element required numerous parts to manufacture and stock and was otherwise more difficult to separate or take apart for cleaning. In addition, certain concentricity problems between the parts was encountered in its manufacture and use.

SUMMARY OF THE INVENTION

The present invention provides a one-way check valve for use in dairy equipment or the like and which can be easily disassembled or assembled without the use of special tools. The invention contemplates two identical end sections which are formed of resilient material and which are interchangeable and cannot be assembled incorrectly. The end sections are easily snapped on or removed from a central valve element guide. A shiftable valve element is mounted on the guide and its proper position in respect thereto is insured so that malfunction does not occur. All of the parts of the present valve are made of resilient material such as plastic, rubber or the like and can be easily disassembled for thorough cleaning, it only being necessary to insert a knife-like object between the end sections to snap them apart. The width of the central guide is such that the resilient shiftable valve element is properly positioned and tensioned when fluid is flowing therethrough so as to be able to return to its accurate sealing position.

Generally, the present invention provides a valve of the above type which is economical to manufacture, has a minimum number of parts, requires no particular or difficult manufacturing tolerances, or close concentricity measurements between the parts.

These and other objects and advantages of the present invention will appear hereinafter as this disclosure progresses, reference being had to the accompanying drawings.

DESCRIPTION OF THE INVENTION

Figure 1:
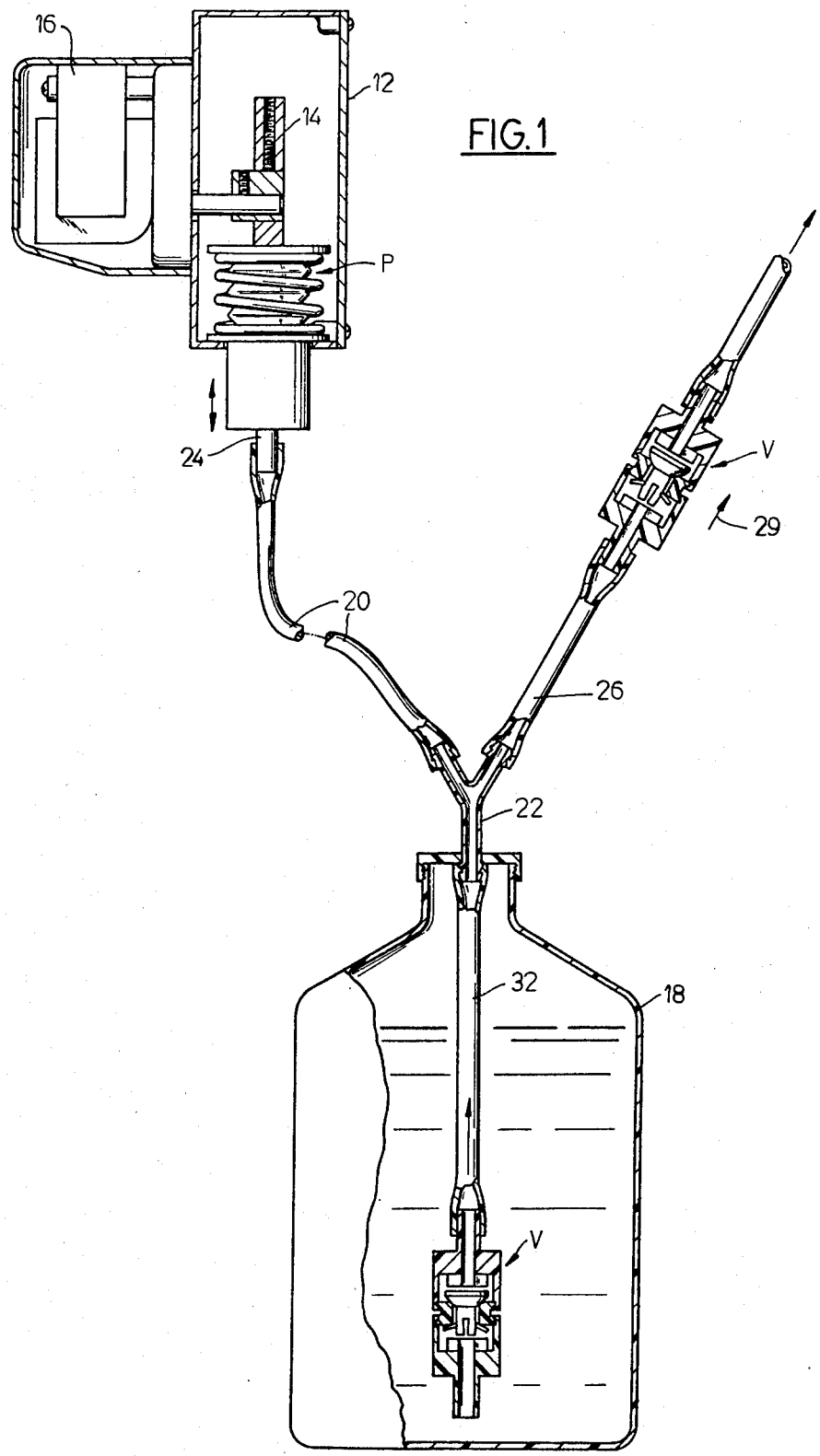
FIG. 1 is an elevational view partially in section of pumping apparatus used in dairy equipment or the like and in which the present invention finds particular utility.

The apparatus shown in FIG. 1 with which the present invention finds utility includes a bellows type pump P mounted in a casing or box 12 and driven through an eccentric means 14 which in turn is driven from the power source, such as an electric motor 16. A container 18 containing the fluid to be pumped is connected by a flexible conduit 20 at its Y-shaped fitting 22 and to the attaching nipple 24 at the lower end of the pump. Another flexible conduit 26 extends from the other branch of the Y-fitting and is adapted to be discharged through a separate location, not shown. The arrow 29 indicates the flow of fluid through the conduit 26. To insure that flow is only in this direction, the one-way check valve V is inserted in the conduit 26. The container also has a downwardly extending fill tube 32 extending from the bottom leg of the Y-fitting and terminates closely adjacent the bottom of the interior of the container. A similar valve V made in accordance with the present invention is located in the lower end of the conduit 32 and adjacent the bottom end of the container. The above arrangement is shown in my co-pending U.S. Pat. application Ser. No. 726,834 filed Sept. 27, 1976 which issued on Sept. 13, 1977 as U.S. Pat. No. 4,047,851, and entitled "Bellows Type Expansible Chamber Pump having Separate Biasing Means."

Figure 5:
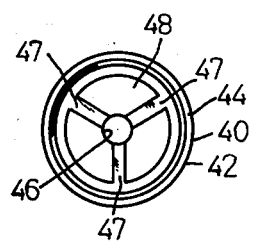
FIG. 5 is a transverse, cross sectional view of one of the identical end sections, the view being taken generally line the line 5—5 in FIG. 4.
Figure 6:
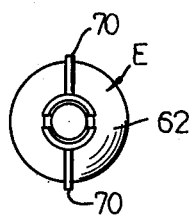
FIG. 6 is a transverse view taken generally along the line 6—6 in FIG. 4 and showing the resilient tails of the shiftable valve element.

Referring in greater detail to the valve V made in accordance with the present invention, the valve includes a pair of identical end sections 40 which are formed or resilient material such as plastic, rubber or the like and each of which includes an end nipple 41 by means of which a flexible conduit can be easily attached thereto simply by inserting the nipple into the end of the conduit, the conduits also preferably being made of resilient material such as rubber, plastic or the like. The end sections are generally cup-shaped, being generally hollow in nature and having a cylindrical wall portion 42 containing an annular groove 43 therearound and located adjacent their end 44. Thus, the end 44 and the annular groove 43 define an annular ridge or flange 45 around the end of the end section opposite the nipple 41. The end sections have a central passage 46 passing therethrough and, as shown in FIG. 5, furthermore have cut away portions 47 in their central disc-like portion 48 so as to insure flow of fluid through the passage 46 even when a shiftable valve element E is shown in the open position of FIG. 2. It will be appreciated that as the end sections are identical, they can be assembled at either end of the valve and also result in the necessity to stock a minimum number of parts.

The valve also includes a center valve guide G also formed of resilient material such as plastic or rubber and which contains a central aperture 50 extending therethrough. A bevelled or chamfered portion 51 is formed in one end of the passage 50 so as to form a good valve seat as will appear. It should also be noted that the guide G has a pair of axially spaced annular flanges 55, 56, formed around the opposite ends of its periphery and these flanges 55, 56 are adapted to be snapped into sealing engagement with the respective grooves 43 of the end sections as shown in FIGS. 2 and 3.

Figure 2:
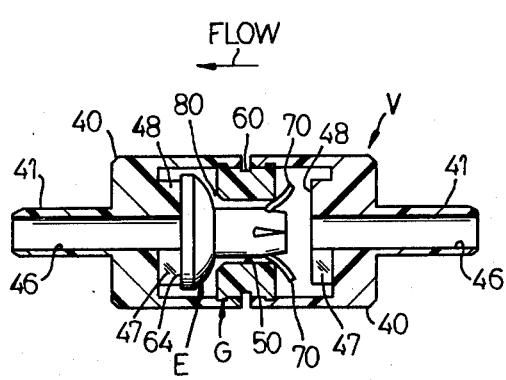
FIG. 2 is a longitudinal, cross sectional view through a valve made in accordance with the present invention and showing the valve element shifted to an open position.
Figure 3:
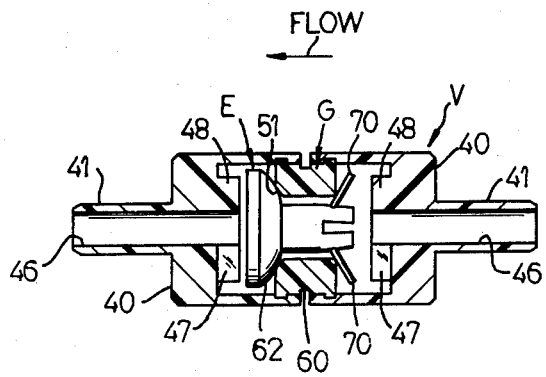
FIG. 3 is a view similar to FIG. 2 but showing the shiftable valve element in a closed position, prohibiting return flow.

The guide G also has a central groove 60 formed around its periphery and intermediate its length, and which groove 60 is exposed, as shown in FIGS. 2 and 3, even when the valve is assembled. In this manner, the valve can be quickly disassembled by inserting a blade or knife edge into the space between the end sections and simply by twisting the blade, the end sections can be snapped free of the guide G.

The shiftable valve element E is conventional in nature and is of the type shown in my U.S. Design Pat. No. D226194 which issued Jan. 30, 1973. This element E is formed of rubber or other resilient material and has a frusto-conical section 62 that is adapted to seat in the bevelled portion 51 of the guide so as to form a good seal therewith when the valve is in the closed or non-fluid flow position shown in FIG. 3. The valve element also has a large flat end 64 which is adapted to abut against the central disc-like portion 48 located in the interior of the end section when the valve is in the flow or open position shown in FIG. 2. Thus, the axial shifting of the valve element E within the assembled end sections is limited.

Figure 4:
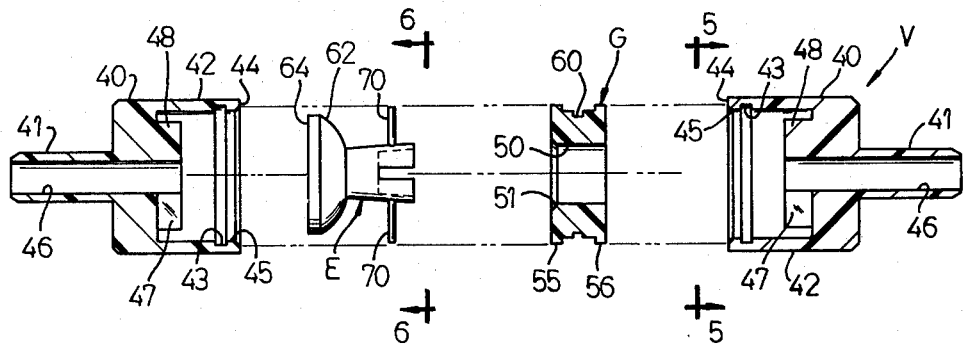
FIG. 4 is a view of the valve shown in FIGS. 2 and 3 but with parts in exploded position.

The valve element E also has a plurality of flexible protrusions or tails 70 formed integrally therewith and extending radially outwardly therefrom. As shown in FIG. 4, when the valve element is not tensioned, these tails 70 extend generally normally to the axis of the valve. When the valve is in the assembled position shown in FIG. 3 and the valve is in the sealed or non-flow position, these tails are bent slightly because of the width of the guide as shown in FIG. 3. This slight bending of the tails acts to tension the element slightly and holds it centered in a good sealing position. On the other hand, when suction is applied to the left end of the valve V as shown in FIG. 2, the valve element E is shifted to the left thereby forming a passage 80 and permitting flow through the valve, and the tails 70 are distorted or bent axially even further, thereby applying a resilient or biasing tension to the valve element to return it to the right as viewed in FIG. 2 or towards the valve closed position.

In operation, when the pump P performs a suction stroke on a container, the valve in the container is opened to permit flow upwardly through the conduit in the container and at the same time the valve in the conduit 26 is forced to a closed position. This causes fluid to be drawn up into conduit 20 a predetermined amount. Then when the pump is forced by the cam into a pumping stroke, the valve V in the container is closed and fluid is forced through conduit 20 and then through the valve V in conduit due to the fact that the valve V in conduit 26 is then opened. At the end of the pumping stroke, valve V in conduit 26 is again closed, preventing fluid from returning from the discharge end of the conduit 26.

The valve provided by the present invention is economically produced and the use of identical end sections are possible. The end sections can be easily snapped on or removed from the central guide. The shiftable valve element is accurately located in the guide and its movement is limited and accurately regulated between valve closing and valve open positions. The relationship between the guide and the element E is such that the element is resiliently biased towards a closed position.

I claim:

1. A quickly disassembled and assembled multi-part one-way check valve comprising, identical end sections formed of resilient material and each having a conduit attaching nipple at one end, a passage therethrough and each also having a generally cylindrical wall at the other end so as to define a generally cup-shaped end section; a central valve guide having a central aperture therethrough which defines a valve seat; inter-engaging means between opposite ends of said guide and said walls of said end sections, said inter-engaging means forming a quickly detachable snap-fit connection between said end sections and said guide, said end sections being spaced apart when assembled on said guide to thereby permit insertion therebetween of a blade-like tool for disengaging said end sections from said guide, said end sections and said guide together defining an interior chamber; a shiftable valve element mounted in said chamber and in said aperture of said guide for axial shifting between valve closed and valve open positions, said element adapted to abut against said guide seat when said valve is in said closed position, said element having resilient means abutting against said guide and for urging said element towards a valve closed position.

2. The valve set forth in claim 1 further characterized in that said inter-engaging means comprises, an annular internal groove around said wall of each end section, and said guide has a pair of annular outwardly extending flanges forming said snap-fit connection with the respective grooves of said end sections.

3. The valve set forth in claim 1 further characterized in that said resilient means of said valve element comprises radially outwardly extending, resilient tails which are flexed by said guide.

4. The valve set forth in claim 3 further characterized in that the width of said guide is sufficient to flex said tails slightly when said valve is in said closed position and which will flex said tails to a greater extent when said valve is in said open position, to thereby bias said element towards the valve closed position.

5. A quickly disassembled and assembled multi-part one-way check valve comprising, identical end sections formed of resilient material and each having a conduit attaching nipple at one end, a passage therethrough and each also having a generally cylindrical wall at the other end so as to define a generally cup-shaped end section; a central valve guide having a central aperture therethrough which defines a valve seat; interengaging means between opposite ends of said guide and said walls of said end sections and comprising an annular internal groove around said wall of each end section, and said guide has a pair of annular outwardly extending flanges forming a quickly engageable snap-fit connection with the respective grooves of said end sections, said end sections being spaced apart when assembled on said guide to thereby permit insertion therebetween of a blade-like tool for disengaging said end sections from said guide, said end sections and said guide together defining an interior chamber; a shiftable valve element mounted in said chamber and in which said aperture of said guide for axial shifting between valve closed and valve open positions, said element adapted to abut against said guide seat when said valve is in said closed position, said element having resilient tails extending laterally outwardly and abutting against said guide and flexed thereby for urging said element forwards a valve closed position.

6. The valve set forth in claim 5 further characterized in that the width of said guide is sufficient to flex said tails slightly when said valve is in said closed position and which will flex said tails to a greater extent when said valve is in said open position, to thereby bias said element towards the valve closed position.

* * * * *